US007937385B2

(12) United States Patent
Bestgen et al.

(10) Patent No.: US 7,937,385 B2
(45) Date of Patent: May 3, 2011

(54) OBTAINING A PLAN FOR EXECUTING A QUERY IN A RELATIONAL DATABASE

(75) Inventors: Robert J. Bestgen, Rochester, MN (US); Wei Hu, Middleton, WI (US); Shantan Kethireddy, Rochester, MN (US); Andrew P. Passe, Rochester, MN (US); Ulrich Thiemann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 12/114,913

(22) Filed: May 5, 2008

(65) Prior Publication Data

US 2009/0276394 A1    Nov. 5, 2009

(51) Int. Cl.
*G06F 17/30*    (2006.01)
(52) U.S. Cl. ...................................................... 707/713
(58) Field of Classification Search .................. 707/713, 707/736, 791, 999.02
See application file for complete search history.

(56) References Cited

U.S. PATENT DOCUMENTS

| 5,822,750 | A  | * | 10/1998 | Jou et al. ................................ 1/1 |
| 6,353,821 | B1 |   | 3/2002  | Gray |
| 6,665,664 | B2 |   | 12/2003 | Paulley et al. |
| 2005/0097118 | A1 | * | 5/2005  | Slutz ............................... 707/101 |
| 2006/0031189 | A1 |   | 2/2006  | Muras et al. |

* cited by examiner

*Primary Examiner* — Fred I Ehichioya
(74) *Attorney, Agent, or Firm* — Cantor Colburn LLP

(57) ABSTRACT

A plan for executing a query in a relational database is obtained. A query for accessing data in the relational database is received. The query specifies N tables in the relational database from which data is to be retrieved. A determination is made whether a syntax of the query matches a syntax of a plan in a plan cache for executing the query. Matches are identified between generic table formats of the N tables specified in the query to generic table formats of N tables specified in the plan responsive to the syntax of the query matching the syntax of a plan in the plan cache for executing the query. The plan for executing the query is obtained based on whether the syntax of the query matches the syntax of the plan and based on identified matches between the generic table formats of the N tables specified in the query to the generic table formats of the N tables specified in the plan.

17 Claims, 3 Drawing Sheets

US 7,937,385 B2

OBTAINING A PLAN FOR EXECUTING A QUERY IN A RELATIONAL DATABASE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

This invention relates to data processing, and in particular, to obtaining a plan for executing a query in a relational database.

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (RDBMS).

In a typical RDBMS, data is externally structured into tables. Each table has a set of one or more columns and rows. The rows, or entries, in the tables generally correspond to data records, and the columns generally correspond to the fields in each data record. Each column typically specifies a name and a data type (e.g., integer, float, string, etc.) and may be used to store a common element of data.

Current relational databases require that queries be composed in query languages. Today, the most widely used query language is Structured Query Language (SQL). However, other query languages are also used.

An SQL interface allows users to formulate relational operations on the tables. Operators are provided in SQL, which allow the user to manipulate the data. Each operator operates on one or more tables and produces a new table as a result. SQL enables information from multiple tables to be linked together to perform complex sets of procedures with a single statement, such as a SELECT statement.

In modern RDBMS, the overhead associated with processing client requests can be troublesome. Cache and buffer overflow, I/O bottlenecks, wasted CPU cycle time, shared memory latch contention, network throughput, and other performance side effects often result from poor planning and untested design.

To avoid these and other by-products of a poorly designed system, a client/server DBMS architecture could benefit greatly from a streamlined database statement processing system. In a typical DBMS architecture, a client issues a database query (hereinafter illustratively referred to as a "SQL query") to a process running on the database server. The server expends a great deal of its run-time resources in parsing the request, creating an execution tree, semantically analyzing the statement, and determining an optimal execution plan. These steps are needed to store and create a "cursor" in cache memory before the server can effectively carry out a client request or return a result set. A cursor is a handle to a query execution area, e.g., an area in memory in which a parsed SQL statement and other information for processing the SQL statement is stored.

Database systems frequently invoke an optimizer to handle the task of creating an execution plan that is optimized to a particular SQL statement. A query optimizer is a component of a database management system that attempts to determine the most efficient way to execute a query. Such query optimizers often operate by selecting from among multiple "plans", or possible implementations of a query, so as to execute the query with the greatest efficiency. The output of an optimizer is typically referred to as a query plan or access plan, which is a form of executable code that can be processed by a database engine to execute the query. Many optimizers operate by selecting or generating multiple potential query plans for a given query, and selecting from the potential query plans an optimal query plan.

Optimization consists of multiple steps including generating query plans, collecting statistics on the data related to the query plans, using the statistics to estimate resource costs of the plan, and selecting a plan with the optimum resource costs. One of the resource intensive tasks of the optimization is collecting the statistics. Statistical information for the data in the underlying database may relate to tables and their indices, objects in a schema, objects in a database, column statistics, etc. Some typical column statistics include the column cardinality (i.e., the number of distinct values in the column), and the Frequent Value List (FVL), which identifies the most populous values in the column.

To perform a search of a table to locate records that match a particular criterion, a table can often be analyzed using either table scans or index probes. A table scan operates more or less by sequentially stepping through each record in a table to find matching records, while an index probe is keyed off of an index that is generated for the table. A table scan is typically more efficient when a large number of records match the criterion, while an index probe (which has additional overhead associated with generating the index) is typically more efficient when only a small number of records match the criterion.

Efficient SQL query plan caching is a problem. Generally, any schemas (with a set of tables and indexes) are generated with the same layout (templatized), in which only the underlying data is different but often has the same statistical properties. As an example, a car manufacturer my have relational databases for each dealer, while a title company may create one schema per order using different templates (pre-defined layouts) to process different types of orders. While this templatized solution works somewhat well for these businesses, a plan cache problem surfaces due to the fact that the same plan may get generated n times for the n different libraries and tables in those libraries. A typical reported problem is that the plan cache is too small because of the number of libraries and tables, and thus it needs to be set very large (e.g., 20 GB). Though the plan cache may be set to be very large, most plans are not reused but are swapped out instead. This is because no match is found with the current way plans are stored and matched in the plan cache.

As a typical example, there may be 1000 schemas with the same layout: tables, customers, orders, suppliers and same set of indexes. In this example, only the names of the schemas are different, e.g., S1, S2, . . . , etc. In this typical scenario, a sample query would look like this:

Select*From S1.customers, S1.orders
where customers.customerid=orders.customerid
where orders.timestamp between '12-106' and '12-3106'

In this example, the query generates a plan instance to be cached or matched, and any other plans referencing data spaces other than S1.customer, S1.orders result in a caching mismatch. Thus, for the 1000 query variation with just a schema name difference, 1000 plans are to be generated or matched when looking for existing plans in order to possibly reuse them.

Generally, caching plans in the plan cache provides benefits by reducing full optimization and reusing matching plans for future database queries. Currently, plans are associated with the actual data spaces. So, in cases in which a system contains a large amount of schemas and query requests that are widely spread among those schemas, the benefits of caching plans are greatly reduced. As there is always a reasonable memory limit for the plan cache size, only certain number of plans can be stored. The new query requests keep hitting mismatches in the cache causing long searching overhead for matching plans, a great chance for current query request to do full-optimization, a higher memory footprint, and higher general overhead, for example for purging old(er) plans out of the plan cache to make room for new ones, when the plan cache limits are reached.

Another problem for relational databases it that is not always obvious to detect that two tables have the same general definition, i.e., the same "signature", e.g., the same columns and the same set of indexes, and just a different name, or are located in just a different schema. In many cases, the underlying table data is the only difference. Currently, the table definition is a direct a part of the table. In businesses, such as a car manufacturer and a tile company, where many schemas are generated following the same templates, each schema contains the same tables, indexes, etc. When executing query requests, the query engine is not be able to see the structural similarity among those tables without a large amount of work. But, the structural similarity is very clear during the generation time.

Currently, the Query engine doesn't consider a plan to be reusable even when it is okay to be applied to similar tables (having the same "signature"). Full optimizations that are kicked off in this case could be avoided.

SUMMARY

According to one embodiment, a method for obtaining a plan for executing a query in a relational database is provided. The method comprises receiving a query for data in the relational database, wherein the query specifies N tables in the relational database from which data is to be retrieved, where N is an integer and determining whether a syntax of the query matches a syntax of a plan in a plan cache for executing the query. The method further comprised identifying matches between generic table formats of the N tables specified in the query to generic table formats of N tables specified in the plan responsive to the syntax of the query matching the syntax of a plan in the plan cache for executing the query; and obtaining a plan for executing the query based on whether the syntax of the query matches the syntax of the plan and based on identified matches between the generic table formats of the N tables specified in the query to the generic table formats of the N tables specified in the plan.

According to another embodiment, a system for obtaining a plan for executing a query in a relational database is provided. The system comprises a query engine for receiving a query for accessing data in the relational database, wherein the query specifies N tables in the relational database from which data is to be retrieved, where N is an integer, determining whether a syntax of the query matches a syntax of a plan in a plan cache for executing the query, and, responsive to the syntax of the query matching the syntax of a plan in the plan cache for executing the query, identifying matches between generic table formats of the N tables specified in the query to generic table formats of N tables specified in the plan. The system further comprises a query optimizer for obtaining a plan for executing the query based on whether the syntax of the query matches the syntax of the plan and based on identified matches between the generic table formats of the N tables specified in the query to the generic table formats of the N tables specified in the plan.

According to another embodiment, a computer program product system for obtaining a plan for executing a query in a relational database is provided. The computer program product comprises a computer usable medium having a computer readable program. The computer readable program, when executed on a computer, causes the computer to receive a query for data in the relational database, wherein the query specifies N tables in the relational database from which data is to be retrieved, where N is an integer, and determine whether a syntax of the query matches a syntax of a plan in a plan cache for executing the query. The computer readable program further causes the computer to identify matches between generic table formats of the N tables specified in the query to generic table formats of N tables specified in the plan responsive to the syntax of the query matching the syntax of a plan in the plan cache for executing the query and obtain a plan for executing the query based on whether the syntax of the query matches the syntax of the plan and based on identified matches between the generic table formats of the N tables specified in the query to the generic table formats of the N tables specified in the plan.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains exemplary embodiments, together with advantages and features, by way of example with reference to the drawings.

DETAILED DESCRIPTION

Figure 1:
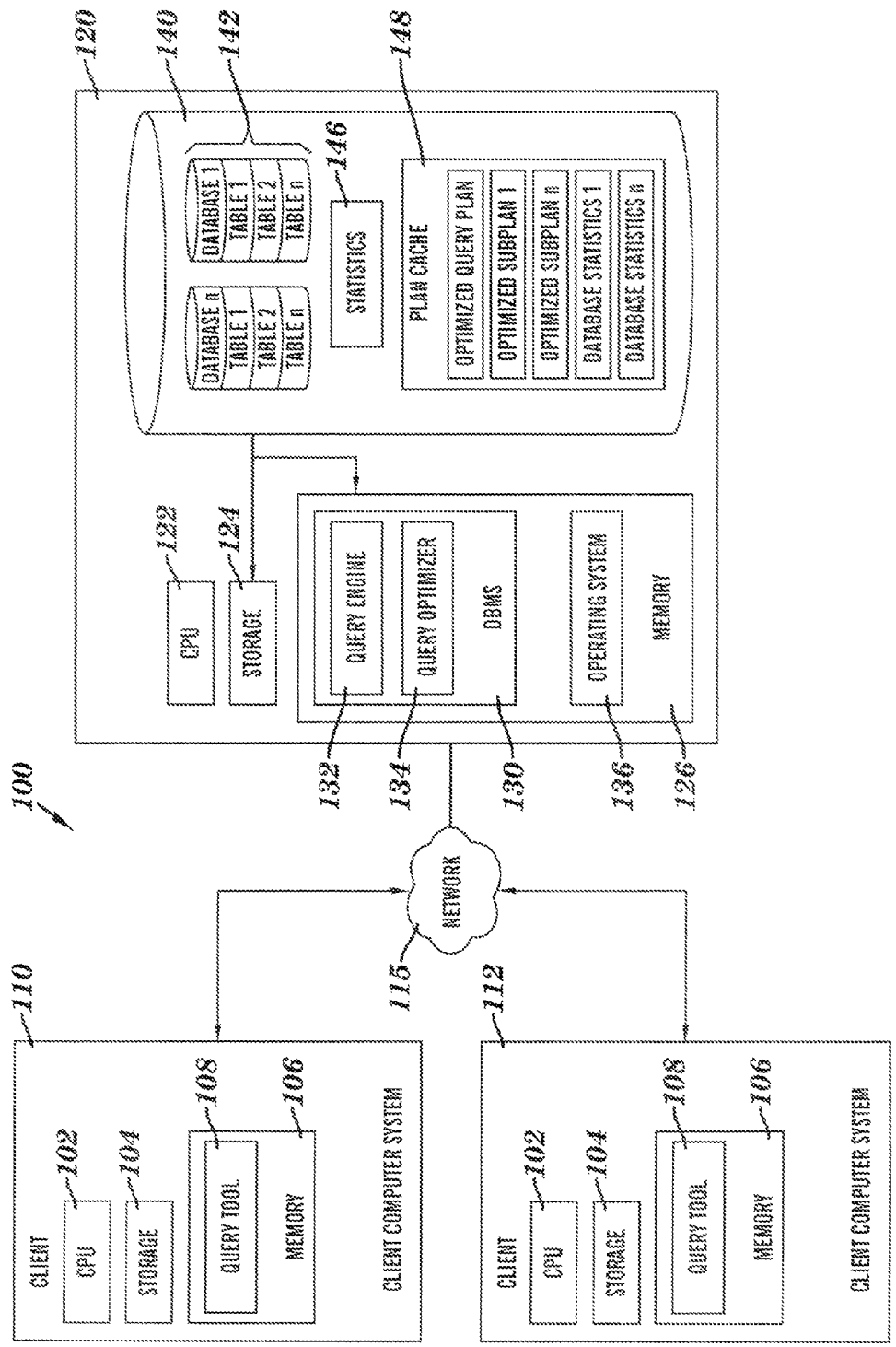
FIG. 1 illustrates a system for obtaining a plan for executing a query for accessing data in a relational database according to exemplary embodiments.

FIG. 1 illustrates a system for obtaining a plan for executing a query for accessing data in a relational database according to exemplary embodiments. According to exemplary embodiments, the system may include computer systems, e.g., desktop computers, server computers laptop computers, etc. The computing environment 100 illustrated in FIG. 1 is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, etc. However, the software applications described herein are not limited to any currently existing computing environment or programming language, and may be adapted to take advantage of new computing systems as they become available.

As shown, client computer systems 110 and 112 each include a CPU 102, storage 114 and memory 106, connected by a bus (not shown). CPU 102 is a programmable logic device that performs all the instruction, logic, and mathematical processing in a computer. Storage 104 stores application programs and data for use by client computer systems 110 and 112. Storage 104 includes hard-disk drives, flash memory devices, optical media and the like. The network 115 represents any kind of data communications network. Accordingly, the network 115 may represent both local and wide are networks, including the Internet. The client computer systems 110 and 112 are also shown to include a query tool 108. In one embodiment, the query tool 108 is a software application that allows end users to access information stored in a database (e.g., database 140). Accordingly, the query tool 108 may allow users to compose and submit a query to a database system, which, in response, may be configured to process the query and return a set of query results. The query tool 108 may be configured to compose queries in a database query language, such as Structured Query Language (SQL). However, it should be noted that the query tool 108 is only shown by way of example; any suitable requesting entity may submit a query (e.g., another application, an operating system, etc.).

In one embodiment, the server 120 includes a CPU 122, storage 124, memory 126, a database 140, and a database management system (DBMS) 130. The database 140 includes data 142, statistics 146, and a plan cache 148. The data 142 represents the substantive data stored by the database 140. The statistics 146 may be generated by the DBMS 130 and may include various elements of metadata describing the characteristics of the database 140. In one embodiment, the statistics 146 may describe the properties of specific columns of the database 140 (i.e., column statistics). For example, the statistics 146 may include the cardinality of a given column (i.e., the number of distinct values in the column), the most-frequently occurring values of a given column, the distribution of values in a given column, a histogram (i.e., a partition of the column values into bands), and the like.

The database 140 contains the data managed by the DBMS 130. At various times, elements of the database 140 may be present in storage 124 and memory 126. The DBMS 130 provides a software application used to organize, analyze, and modify information stored in a database 140. The DBMS 130 includes a query engine 132 and a query optimizer 134. The query engine 132 may be configured to process database queries submitted by a requesting application (e.g., a query generated using query tool 108) and to return a set of query results to the requesting application. The query optimizer 134 may be configured to select an efficient query plan, or series of executed instructions, for executing a query. More specifically, the query optimizer 134 selects the efficient query plan by determining which query plan is likely to require the fewest system resources (e.g., processor time, memory allocation, etc.) To make this determination, the query optimizer 134 utilizes the statistics 146, which describe characteristics of the fields (i.e., columns) included in the query.

The dataspace 140 may contain objects, such as a plan cache 148 and a database 142 containing tables. The dataspace may also contain objects such as runtime statistics 146. In one embodiment, the statistics 146 are generated from data sampled from a given column of the database 140. The server 120 operates under the control of operating system 136 and executes or otherwise relies upon various computer software applications, components, programs, objects, modules, data structures, etc. (e.g. database application query optimizer 134).

According to exemplary embodiments, database systems can be programmed to generate statistics on data stored in selected database columns. Database statistics typically include, but are not limited to the following: the time of the last statistics collection, the number of rows in the table in which the column is stored, the approximate number of pages occupied by the data stored in the column, the average length of the data stored in the column, the distribution of values in the column (i.e. a histogram), the densities of values in the column, and the cardinality or number of distinct values.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable-type media such as volatile and non-volatile memory devices, floppy and other removable disks, hard disk drives, optical disks (e.g., CD-ROM's, DVD's, etc.), among others, and transmission-type media such as digital and analog communication links.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

According to one embodiment, generic table formats (GTFs) are generated to describe a table at an abstract level, referred to as a data space pattern. The GTFs may be generated by the query optimizer 134, triggered by the DBMS 130 that allow for explicit creation of the GTF via SQL Besides the physical format (column data types), the information included in the GTFs may be statistical data, such as column cardinalities, total record count, and part of the columns' FVLs (Frequent Value Lists). The information is generic enough such that the optimizer does not need to know information about the underlying data spaces.

According to an exemplar embodiment, plans stored in the plan cache 148 do not contain the actual table (data space) address. Rather the plans stored in the plan cache contain a generic DataSource Link (DSL) along with a GTF, as a placeholder for an actual data space, which can be plugged in at runtime so that the plan will pick up the right table for the data accesses. At plan match/search time, the plan cache performs data space pattern matching via the GTF to identify reusable plans.

Advantages provided by the GTF pattern matching include reduced memory footprint of the plan cache and increased number and duration of plans being resident in the cache. Other advantages include increased reusability and efficiency, less reoptimization and improved open time performance, and reduced look up time for plan matching. Not only are plans regarding whole schemas consolidated with duplicated data space structure, but also plans are generally consolidated as long as the GTFs of the data spaces in query requests are similar/match. Also, exemplary embodiments allow for remote optimizations due to the fact that the GTF(s) can be optimized such that the optimizer is DSL agnostic.

In combination with the hierarchy constraint technique described below, the matching process can be further improved. This will enable "generic" optimizations without knowledge of the underlying data spaces.

According to exemplary embodiments, the hierarchy constraints of tables point to the same Abstract Dataspace Definition object if they are of the same GTF. Thus, according to exemplary embodiments, the hierarchy constraints of tables specified in a query may be compared with hierarchy constraints of tables specified in a plan in the plan cache to determine whether the GTFs of the tables in the query match the GTFs of the tables specified in the plan. The HC serves as a guarantee that a table has a specific GTF. Thus, tables specified in the query and tables specified in the plan can be quickly matched based on just the HC's of the tables, if the HC's are available. This greatly shortens the matching process and allows users to choose forcing the reuse of plans when simply the list of hierarchy constraints matches. In this case, the cached plan entries with all GTFs having a HC (hierarchy constraint) defined can be set to a HC matching only entry.

As an example, consider the car manufacturer case, in which all customer tables in schema Sn have HC defined to the same Abstract Dataspace Definition customer_template, and so the same for other tables in Sn. Given that the data patterns among those schemas (for dealers) are similar, the same query targeting any dealer can share the same plan in the plan cache with a very quick lookup and matching process.

According to an exemplary embodiment, SQL syntax is allowed to create an Abstract Table Definition (ATD) for a table containing definition for columns, indexes, etc. This is the structural pattern of the table. This pattern or ATD, which may also be referred to as the GTF, is abstracted from the actual table instances that store data. Also, SQL syntax is allowed to create tables with a hierarchy constraint referring to an ATD. The hierarchy constraint can be either force type or non-force type. The ATD definition is kept in a watch list containing the list of tables with a hierarchy constraint referring this ATD. When the ATD is changed, the watch list is checked. The tables with forced hierarchy constraints apply changes cascading. The tables with non-forced hierarchy constraint may have hierarchy constraints removed and then be removed from watch list. When a user intends to alter a table or a related index change happens, the hierarchy constraint may be removed if key elements are to be altered (indexes in the ATD, columns in the ATD). Tables with the same structural patterns may be identified by simply comparing the hierarchy constraints of two tables. This saves the structural table pattern matching effort of the query optimizer and reduces the plan reusability check down to the statistical (FVL, cardinality) data space pattern check.

According to an exemplary embodiment, an ATD is defined with column and index definitions. Getting the abstract set: (cols and idxs are symbol to represent definitions which do not include names for the table, columns or indexes).

atd1<col1, col2, . . . , colN; idx1, idx2, . . . , idxM>

A table that matches this ATD's column definition pattern. Indexes against the new table matching the index definition pattern are created. Hierarchy constraints are added to the table, such as: alter table s1.t1 add hierarchy constraint forced atd1; similarly: alter table s2.t1 add hierarchy constraint forced atd1; now s1.t1 and s2.t1 both contains the hierarchy constraint. and watch list of atd1 has: s1.t1, s2.t1 in list.

This provides improved table pattern matching. Without the hierarchy constraint describe herein, when comparing structural table patterns to identify reusability of plan against s1.t1, the underlying dataspace definitions have to be created for the table and all related indexes, and then the dataspace definitions have to be compared. According to exemplary embodiments, this can be efficiently done by the result of testing atd1=atd1.

Advantages provided according to exemplary embodiments include efficient table structural table pattern matching with a single hierarchy constraint comparison, improved plan cache efficiency, reusability and open time performance. As a side benefit, automate cascading synchronization brings easy and guaranteed maintenance of schemas and tables from the same template.

Figure 2:
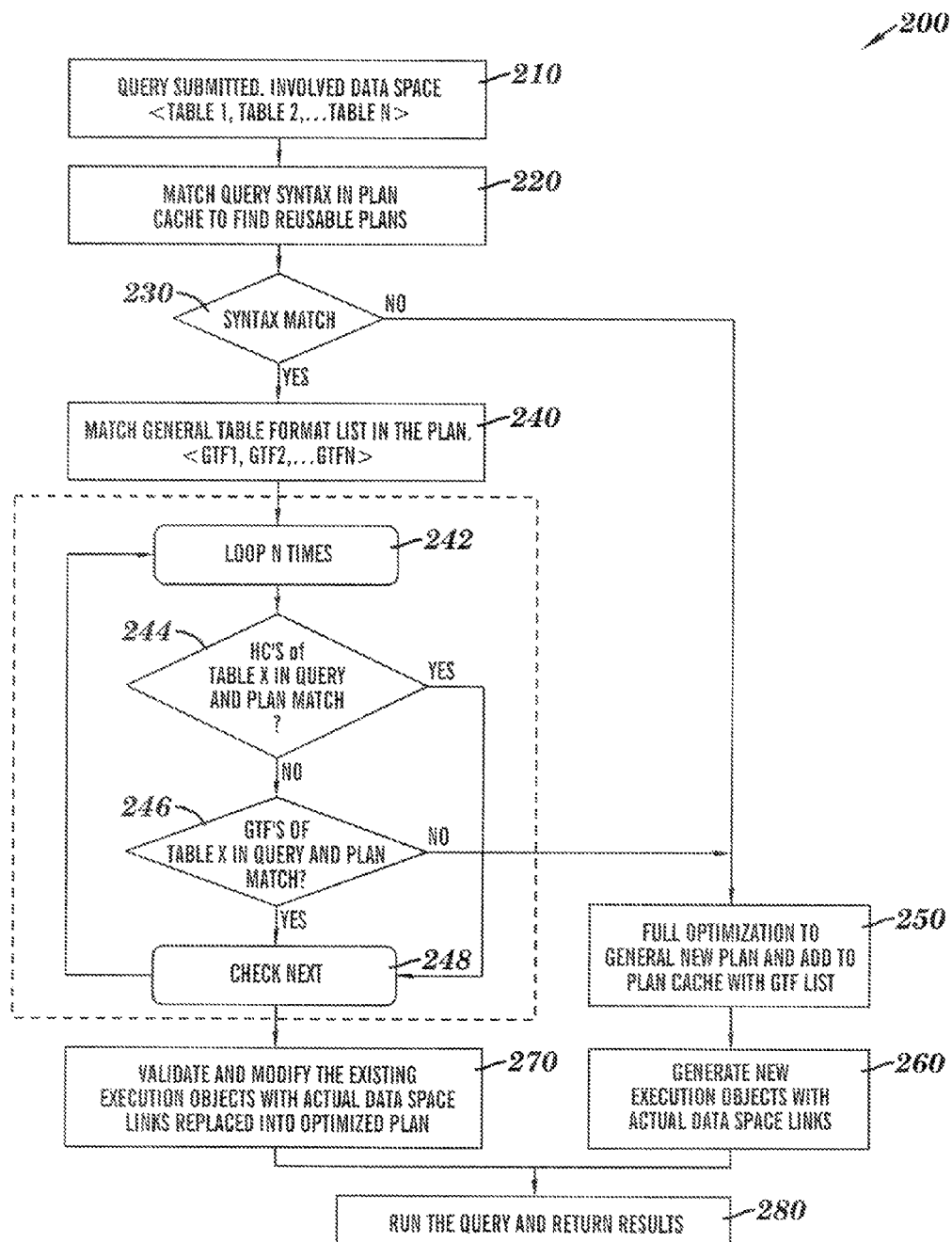
FIG. 2 illustrates a method for obtaining a plan for executing a query for accessing data in a relational database according to exemplary embodiments.

FIG. 2 illustrates an exemplary method 200 for obtaining a plan for executing a query in a relational database according to an exemplary embodiment. Queries are submitted at step 210. The queries involve data spaces <Table 1, Table 2, . . . , TableN>. The SQL query syntax is analyzed to determine whether it matches in the plan cache to reusable plans at step 220. At step 230, a determination is made whether there is a syntax match. If there is a syntax match, the process continues at step 240, which is a placeholder for a loop for matching the generic table format list for N tables specified in the query to the list of generic table formats for N tables specified in a plan in the plan cache, where N is an integer. This matching may include steps 242-248 shown in detail as a separate loop indicated by dashed lines. At step 242, the loop is entered. At step 244, a determination is made whether a Table X specified in the query has the same hierarchical constraint as a Table X specified in the plan. If so, the process proceeds to step 248, at which the next table is checked by returning to step 242. If the hierarchical constraints match, the GTFs also match. Thus, time that would be spent matching the GTFs can be saved by just matching the hierarchy constraints.

If the hierarchical constraints do not match (which may be the case because the hierarchical constraints are unavailable), a determination is made at step 246 whether a GTF of Table X specified in the query matches the GTF of Table X specified in the plan. If so, at step 248, the process returns to step 242, and the next table is checked.

If, at step 230, it is determined there is no syntax match, or at step 246, it is determined that the GTF of Table X specified in the query does not match the GTF of Table X specified in the plan, the process proceeds to step 250 at which a full optimization to a general new plan is performed, and the plan is added to the plan cache. New execution objects are generated at step 260 with actual space data liners, and the query is run and the results returned at step 280.

If step 248 is reached and all the tables are checked, the process proceeds to step 270, at which the existing execution objects are validated and modified with actual data space links replaced into an optimized plan. From there, the process proceeds to step 280, at which the query is run and the results are returned.

Figure 3:
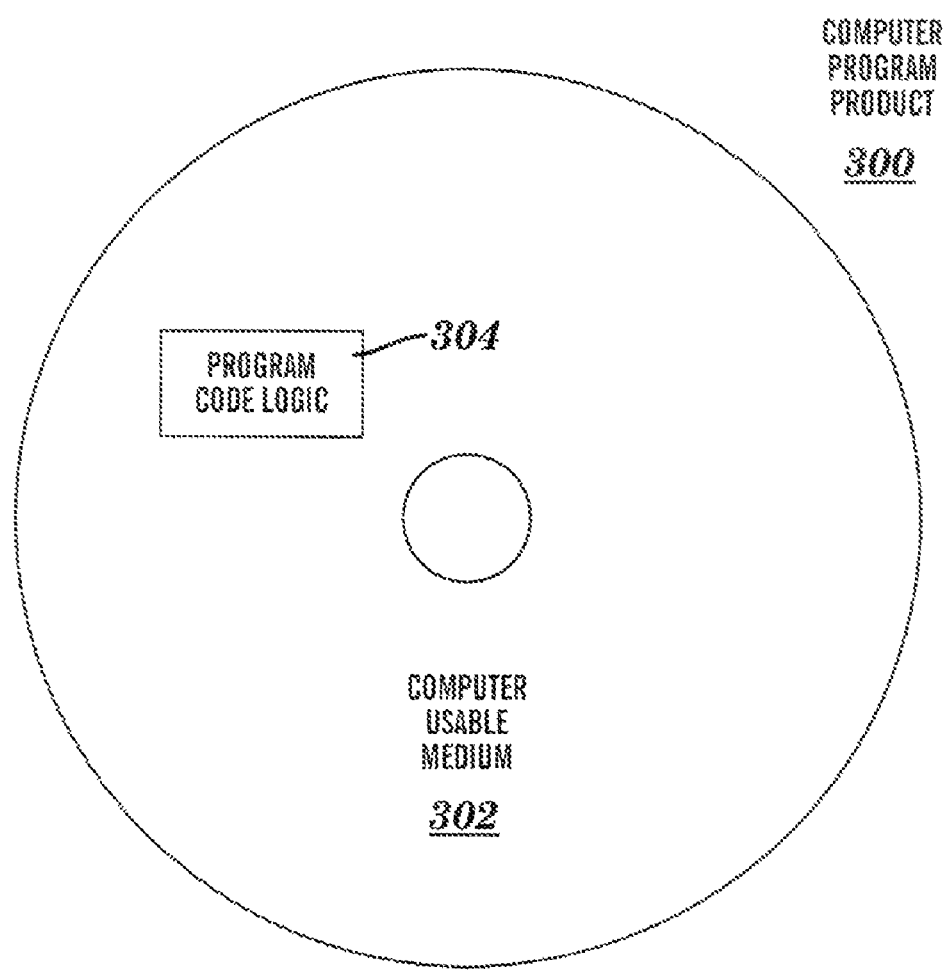
FIG. 3 illustrates a computer program product for obtaining a plan for accessing data in a relational database according to exemplary embodiment.

The capabilities of the present invention can be implemented in software, firmware, hardware or some combination thereof. As described above, embodiments can be embodied in the form of computer-implemented processes and apparatuses for practicing those processes. In exemplary embodiments, the invention is embodied in computer program code executed by one or more network elements. Embodiments include a computer program product 300 as depicted in FIG. 3 on a computer usable medium 302 with computer program code logic 304 containing instructions embodied in tangible media as an article of manufacture. Exemplary articles of manufacture for computer usable medium 302 may include floppy diskettes, CD-ROMs, hard drives, universal serial bus (USB) flash drives, or any other computer-readable storage medium, wherein, when the computer program code logic 304 is loaded into and executed by a computer, the computer becomes an apparatus for practicing the invention. Embodiments include computer program code logic 304, for example, whether stored in a storage medium, loaded into and/or executed by a computer, or transmitted over some transmission medium, such as over electrical wiring or cabling, through fiber optics, or via electromagnetic radiation, wherein, when the computer program code logic 304 is loaded into and executed by a computer, the computer becomes an apparatus for practicing the invention. When implemented on a general-purpose microprocessor, the computer program code logic 304 segments configure the microprocessor to create specific logic circuits.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments have been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for obtaining a plan for executing a query in a relational database, comprising:

Receiving, by the computer, a query for data in the relational database, wherein the query specifies N tables in the relational database from which data is to be retrieved, where N is an integer;

determining, by the computer, whether syntax of the query matches syntax of a plan in a plan cache for executing the query;

responsive to the syntax of the query matching the syntax of a plan in the plan cache for executing the query, identifying, by the computer, matches between generic table formats of the N tables specified in the query to generic table formats of N tables specified in the plan;

obtaining, by the computer, a plan for executing the query based on whether the syntax of the query matches the syntax of the plan and based on identified matches between the generic table formats of the N tables specified in the query to the generic table formats of the N tables specified in the plan; and wherein the step of obtaining a plan comprises using the plan in the plan cache for executing the query or generating a new plan for executing the query based on the whether the syntax of the query matches the syntax of the plan in the plan cache for executing the query and based on identified matches between the generic table formats of the N tables specified in the query to the generic table formats of the N tables specified in the plan.

2. The computer-implemented method of claim 1, wherein a generic table format describes a table at an abstract level including information regarding a physical format of the table and statistical data.

3. The computer-implemented method of claim 1, wherein the N tables specified in the plan have hierarchy constraints, the N tables specified in the query have hierarchy constraints, and the step of identifying matches comprises:

determining whether the hierarchy constraints of the N tables specified in the plan match the hierarchy constraints of the N tables specified in the query.

4. The computer-implemented method of claim 3, wherein tables having matching hierarchy constraints have matching generic table formats.

5. The computer-implemented method of claim 3, further comprising determining whether the generic table formats of the N tables specified in the plan match the generic table formats of the N tables specified in the query responsive to a determination that the hierarchy constraints of the N tables specified in the plan do not match the hierarchy constraints of the N tables specified in the query.

6. The computer-implemented method of claim 5, wherein the step of obtaining the plan comprises using the plan in the plan cache responsive to a determination that the hierarchy constraints of the N tables specified in the plan match the hierarchy constraints of the N tables specified in the query or a determination that the generic table formats of the N tables specified in the plan match the generic table formats of the N tables specified in the query.

7. The computer-implemented method of claim 5, wherein the step of obtaining the plan comprises generating a new plan responsive to:

the syntax of the query not matching the syntax of the plan; or a determination that the hierarchy constraints of the N tables specified in the plan do not match the hierarchy constraints of the N tables specified in the query and a determination that the generic table formats of the N tables specified in the plan do not match the generic table format of the N tables specified in the query.

8. A computing system for obtaining a plan for executing a query in a relational database, the computing system comprising a processor configured to:
- provide a query engine for receiving a query for accessing data in the relational database, wherein the query specifies N tables in the relational database from which data is to be retrieved, where N is an integer, determining whether a syntax of the query matches a syntax of a plan in a plan cache for executing the query, and, responsive to the syntax of the query matching the syntax of a plan in the plan cache for executing the query, identifying matches between generic table formats of the N tables specified in the query to generic table formats of N tables specified in the plan;
- provide a query optimizer for obtaining a plan for executing the query based on whether the syntax of the query matches the syntax of the plan and based on identified matches between the generic table formats of the N tables specified in the query to the generic table formats of the N tables specified in the plan; and
- wherein the query optimizer uses the plan in the plan cache for executing the query or generating a new plan for executing the query based on the whether the syntax of the query matches the syntax of the plan in the plan cache for executing the query and based on identified matches between the generic table formats of the N tables specified in the query to the generic table formats of the N tables specified in the plan.

9. The computing system of claim 8, wherein a generic table format describes a table at an abstract level including information regarding a physical format of the table and statistical data.

10. The computing system of claim 8, wherein the N tables specified in the plan have hierarchy constraints, the N tables specified in the query have hierarchy constraints, and the query tool identifies matches by:
- determining whether the hierarchy constraints of the N tables specified in the plan match the hierarchy constraints of the N tables specified in the query.

11. The computing system of claim 10, wherein tables having matching hierarchy constraints have matching generic table formats.

12. The computing system of claim 10, wherein the query tool determines whether the generic table formats of the N tables specified in the plan match the generic table formats of the N tables specified in the query responsive to a determination that the hierarchy constraints of the N tables specified in the plan do not match the hierarchy constraints of the N tables specified in the query.

13. A computer program product including a non-transitory computer readable storage medium having computer executable instructions stored thereon that, when executed by a computer processor, direct the computer processor to perform a method of obtaining a plan for executing a query in a relational database, the method comprising:
- receiving a query for data in the relational database, wherein the query specifies N tables in the relational database from which data is to be retrieved, where N is an integer;
- determine whether a syntax of the query matches a syntax of a plan in a plan cache for executing the query;
- responsive to the syntax of the query matching the syntax of a plan in the plan cache for executing the query, identify matches between generic table formats of the N tables specified in the query to generic table formats of N tables specified in the plan;
- obtain a plan for executing the query based on whether the syntax of the query matches the syntax of the plan and based on identified matches between the generic table formats of the N tables specified in the query to the generic table formats of the N tables specified in the plan; and
- wherein the plan for executing the query is obtained by using the plan in the plan cache for executing the query or generating a new plan for executing the query based on the whether the syntax of the query matches the syntax of the plan in the plan cache for executing the query and based on identified matches between the generic table formats of the N tables specified in the query to the generic table formats of the N tables specified in the plan.

14. The computer program product of claim 13, wherein a generic table format describes a table at an abstract level including information regarding a physical format of the table and statistical data.

15. The computer program product of claim 13, wherein the N tables specified in the plan have hierarchy constraints, the N tables specified in the query have hierarchy constraints, and the step of identifying matches comprises:
- determining whether the hierarchy constraints of the N tables specified in the plan match the hierarchy constraints of the N tables specified in the query.

16. The computer program product of claim 15, wherein tables having matching hierarchy constraints have matching generic table formats.

17. The computer program product of claim 15, further comprising determining whether the generic table formats of the N tables specified in the plan match the generic table formats of the N tables specified in the query responsive to a determination that the hierarchy constraints of the N tables specified in the plan do not match the hierarchy constraints of the N tables specified in the query.

* * * * *